US012741165B2

(12) United States Patent
Egbert

(10) Patent No.: US 12,741,165 B2
(45) Date of Patent: Sep. 22, 2026

(54) SAFETY DRONE FOR ARRESTING THE FALL OF A USER

(71) Applicant: Safety Drone, LLC, Fort Wayne, IN (US)

(72) Inventor: Tyler Egbert, Grabill (IN)

(73) Assignee: Safety Drone, LLC, Fort Wayne, IN (US)

( * ) Notice: Subject to any disclaimer, the term of this patent is extended or adjusted under 35 U.S.C. 154(b) by 0 days.

(21) Appl. No.: 19/036,823

(22) Filed: Jan. 24, 2025

(65) Prior Publication Data

US 2025/0235720 A1 Jul. 24, 2025

Related U.S. Application Data

(60) Provisional application No. 63/624,587, filed on Jan. 24, 2024.

(51) Int. Cl.
*A62B 35/00* (2006.01)
*A62B 1/00* (2006.01)
*B64U 10/13* (2023.01)
*B64U 101/55* (2023.01)

(52) U.S. Cl.
CPC ............ *A62B 35/0018* (2013.01); *A62B 1/00* (2013.01); *B64U 10/13* (2023.01); *B64U 2101/55* (2023.01)

(58) Field of Classification Search
CPC ............ B64U 2101/55; B64U 2101/57; B64U 2101/58; B64U 2101/61; B64C 39/026; B63C 9/01
See application file for complete search history.

(56) References Cited

U.S. PATENT DOCUMENTS

| | | | |
|---|---|---|---|
| 10,358,196 B2 | 7/2019 | Tang | |
| 11,358,031 B2 | 6/2022 | Dickenson et al. | |
| 11,952,088 B2 | 4/2024 | Ökvist et al. | |
| 2018/0312257 A1* | 11/2018 | Near | B64C 39/026 |

FOREIGN PATENT DOCUMENTS

| | | |
|---|---|---|
| CN | 109250115 A | 1/2019 |
| CN | 214002042 U | 8/2021 |
| CN | 112249325 B | 4/2024 |

(Continued)

OTHER PUBLICATIONS

"Gravihook—Gravity Re-Defined", Gravitec Systems Inc., Poulsbo, Washington, taken from https://gravitec.com/gravitecs-fall-protection-training-campus/2020-april-fools/gravihook/, Sep. 16, 2024 (8 pages).

(Continued)

*Primary Examiner* — Nicholas McFall
(74) *Attorney, Agent, or Firm* — TAYLOR & EDELSTEIN, PC

(57) ABSTRACT

An aerial drone system includes: a drone configured for flying, for being coupled with a user, and for operating autonomously at a separation distance from the user without supporting the user when the user is not fallen; and a control system operatively coupled with the drone and configured for: detecting a fall of the user; using the drone to arrest the fall of the user upon detecting the fall and to support the user in the air; and using the drone to fly the user to a platform.

6 Claims, 5 Drawing Sheets

(56) References Cited

FOREIGN PATENT DOCUMENTS

KR 10-2033248 B1 10/2019

OTHER PUBLICATIONS

"Real-time monitoring of work-at-height safety hazards in construction sites using drones and deep learning", Mohammad Z. Shanti, et al., Journal of Safety Research, vol. 83, taken from https://www.sciencedirect.com/science/article/abs/pii/S0022437522001475, pp. 364-370, Dec. 2022 (10 pages).

"The Rise of Drone", Howie Scarboro, Fall Protection Distributors LLC, taken from https://standingseamroofanchor.com/latest-news/the-rise-of-drones/?srsltid=AfmBOorbt-g2LdOk_9MRGmO9ZatFVAM79Om2YJIxtkDjYksfr1ztuHF3, Nov. 20, 2023 (8 pages).

* cited by examiner

SAFETY DRONE FOR ARRESTING THE FALL OF A USER

CROSS REFERENCE TO RELATED APPLICATIONS

This is a non-provisional application based upon U.S. provisional patent application Ser. No. 63/624,587, entitled "SAFETY DRONE FOR ARRESTING THE FALL OF A CONSTRUCTION WORKER", filed Jan. 24, 2024, which is incorporated herein by reference.

BACKGROUND OF THE INVENTION

1. Field of the Invention

The present invention relates to drones, and, more particularly, to autonomous motion tracking by drones.

2. Description of the Related Art

Drones are flying robots that can be controlled remotely by a human operator or can be controlled autonomously (at least partially) by way of software. One known operation of autonomously controlled drones is to perform autonomous tracking of an object, such as a human being, for example, a human being that is moving across the ground in some manner, such as walking, running, or riding a motorcycle. The drone can be programmed to follow the human being not only with the onboard camera of the drone but by flying so as to maintain generally, for example, a certain distance and a certain vantage point (such distance and vantage point can be set by an operator) with respect to the human being and to avoid obstacles in the flight path of the drone, such as trees.

In the field of construction, construction workers often work at heights above the ground that could be fatal if the construction worker were to fall from the height to the ground. Safety measures have been taken to protect the construction worker in the event of such a fall. For example, it is known to install safety nets which may stop the fall of the construction worker and/or to tether the construction worker to a fixed object by way of a rope, for instance.

What is needed in the art is to improve upon these known safety methods of helping a construction worker in the event of a fall.

SUMMARY OF THE INVENTION

The present invention provides an aerial drone system that is able to detect the fall of the user (such as a construction worker), to arrest the fall of the user using a harness assembly and a tether, and to fly the user to the ground safely.

The invention in one form is directed to an aerial drone system which includes: a drone configured for flying, for being coupled with a user, and for operating autonomously at a separation distance from the user without supporting the user when the user is not fallen; and a control system operatively coupled with the drone and configured for: detecting a fall of the user; using the drone to arrest the fall of the user upon detecting the fall and to support the user in the air; and using the drone to fly the user to a platform.

The invention in another form is directed to a method of using an aerial drone system, the method including the steps of: providing that the aerial drone system includes a drone and a control system operatively coupled with the drone; coupling the drone with a user; flying the drone; operating the drone autonomously at a separation distance from the user without supporting the user when the user is not fallen; detecting, by way of the control system, a fall of the user; using the drone, by way of the control system, to arrest the fall of the user upon detecting the fall and to support the user in the air; and using the drone, by way of the control system, to fly the user to a platform.

An advantage of the present invention is that it provides a way to save a user working at heights in the event of a fall without the user having to employ various hook-ups or netting to arrest a fall or to use the present invention in combination with such safety measures to provide redundancy.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiment of the invention, and such exemplifications are not to be construed as limiting the scope of the invention in any manner.

DETAILED DESCRIPTION OF THE INVENTION

Figure 1:
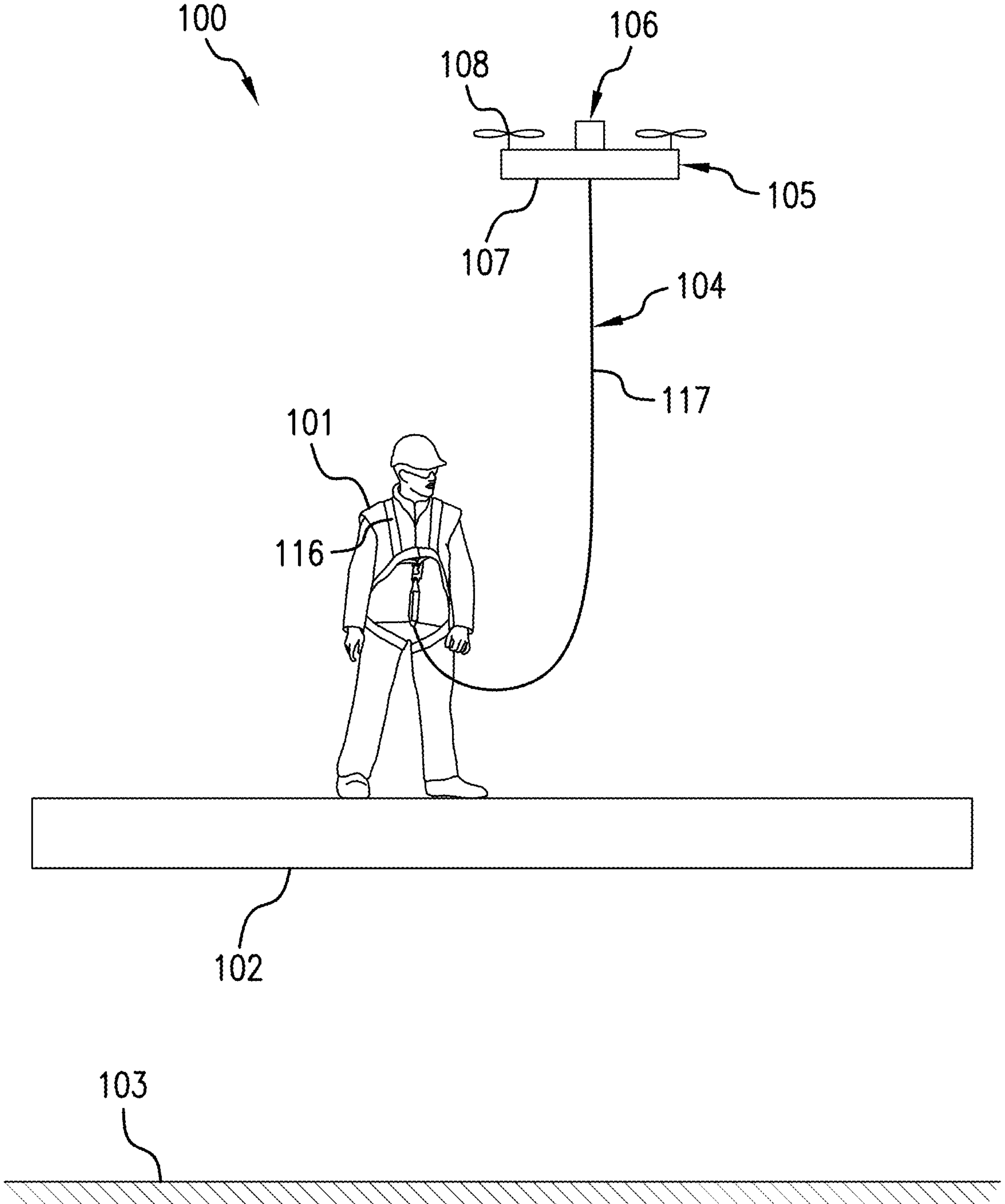
FIG. 1 is schematically a side view of an aerial drone system, in accordance with an exemplary embodiment of the present invention.

Referring now to the drawings, and more particularly to FIG. 1, there is shown schematically a side view of a drone system 100 coupled with a user 101 (in this case, a human being 101). Human being 101 (which can also be referred to simply as person 101) is standing on an elevated platform 102, which is elevated above a platform 103. Elevated platform 102 can be any structure—natural or man-made—that is located above platform 103. Herein, it is assumed that elevated platform 102 is a man-made structure, such as a building, which is being built by person 101, such that person 101 can be referred to as construction worker 101. Platform 103 can be the earth (i.e., terra firma), a surface of a body of water, or any man-made structure, and platform 103 (regardless of which embodiment platform 103 takes)—with the aid of drone system 100—can serve as a landing platform for construction worker 101 in the event that construction worker 101 falls from elevated platform 102. Drone system 100 (schematically shown) includes a harness assembly 104, a drone 105, and a control system 106 operatively coupled with drone 105.

Harness assembly 104 can be any harness assembly coupled (or configured for coupling) with both construction worker 101 and drone 105 and thereby for coupling construction worker 101 and drone 105 together. Harness assembly 104 is shown schematically in FIG. 1 to be coupled with both construction worker 101 and drone 105. Further, harness assembly 104 is configured for supporting the weight of construction worker 101 when construction worker is suspended in the air by drone 105 by way of harness assembly 104. Thus, by way of example and not limitation, harness assembly 104 can include ropes, straps, carabiners, and/or vests, and/or the like. For instance, harness assembly 104 includes a body portion 116 (shown schematically as an "X" in FIG. 1 and attached to a body of user 101) and a tether 117 which couples with drone 105 and body portion 116 and thus to user 101.

Drone 105 is configured for flying, for being coupled with user 101, and for operating autonomously at a separation distance (which can be predetermined) from user 101 without supporting user 101 when user 101 is not fallen (that is, user 101 is not in a fallen condition and, thus, tether 117 is generally in a slack condition). Drone 105, at least according to embodiments of the present invention, can be launched from a platform or from the hand of user 101 or another person, but after being launched drone 105 is configured for flying at a separation distance (which can be variable during operation) from user 101 while user 101 goes about his/her work. Drone 105 is coupled with harness assembly 104 at one end of harness assembly 104, and is thus configured for supporting construction worker 101 in the air in the event that construction worker 101 falls off of elevated platform 102. According to an embodiment of the present invention, drone 105 includes a frame 107 and propellers 108 coupled with frame 107 (the number of propellers 108 can be any suitable number, and, further, though propellers 108 are shown, any suitable way for flying drone 105 falls within the scope of the present invention), which are coupled with frame 107 and configured for enabling drone 105 to fly. Drone 105 can be formed as (by way of example and not limitation) a quadcopter or a tricopter. Drone 105, according to an advantageous exemplary embodiment of the present invention, is unmanned, meaning that no one is actively controlling drone 105 while control system 106 monitors construction worker 101. Alternatively, according to another exemplary embodiment of the present invention, drone 105 can be actively controlled by an operator (that is, by way of a remote control) so as to monitor construction worker 101, more specifically, to detect whether construction worker 101 has fallen and, if so, to safely deliver construction worker 101 to platform 103. Before user 101 has fallen, drone 105 can be said to be loitering about user 101, though this loitering is active (i.e., monitoring whether user has fallen, avoiding obstacles, following user 101 so as to maintain, for example, the predetermined separation distance from user 101 as user traverses a structure, i.e., a bridge or building that is being constructed).

Control system 106 includes a controller (which can be referred to as a controller system, which can include a drone controller aboard drone 105, the drone controller being coupled with frame 107), an input/output device (which, for example, is configured for enabling a user to input commands to the controller system and for outputting commands to the controller system), at least one sensor configured for enabling drone 105 to sense construction worker 101 and the surroundings of drone 105 (such as obstructions, i.e., trees, buildings, elevated platform 102, platform 103), and actuators, each of which can be operatively coupled with frame 107 (this is one exemplary embodiment of control system 106) (drone 105 can also be said to include at least one of these sensor(s) and the actuators, as well as any drone controller of the controller system). Regarding the at least one sensor, the at least one sensor (one or more of which can be onboard drone 105 and thus coupled with frame 107) can be configured for sensing construction worker 101 and the surroundings and for outputting a respective sensor signal to the controller system. At least one of the sensor(s) can be formed as an optical sensor, such as a camera. Regarding the actuators, the actuators can include propellers 108 and any devices of drone 105 configured for adjusting propellers 108 with respect to a speed of each propeller 108 and a position of each propeller 108 (so as to control direction of flight of drone 105). Further, the actuators are configured for receiving a respective adjustment signal from the controller system to adjust, for example, the speed and/or position of propellers 108 such that propellers 108 operate at a desired speed and position, so that drone 105 travels at the desired speed and in the desired direction. The controller system is configured for receiving the respective sensor signal from the senor(s), for determining the respective adjustment signal based at least in part on the respective sensor signal, and for outputting the respective adjustment signal to the actuators. For example, the sensor(s) are configured for detecting when construction worker 101 falls off of elevated platform 102 and for sending a sensor signal associated therewith to the controller system; the controller system is configured for receiving this sensor signal, for determining an adjustment signal based at least in part on this sensor signal, and for outputting the adjustment signal to the actuators, so that drone 105 arrests the fall of the construction worker and safely lowers the construction worker to, for example, platform 103. Thus, control system 106 is configured for detecting a fall of construction worker 101 and for arresting the fall of construction worker 101 upon detecting the fall. Thus, control system 106 is configured for: detecting a fall of user 101; using drone 105 and harness assembly 104 to arrest a fall of user 101 upon detecting the fall and to support user 101 in the air; and using drone 105 to fly user 101 safely to platform 103 (i.e., the ground).

In general, the controller system may correspond to any suitable processor-based device(s), such as a computing device or any combination of computing devices. The controller system may generally include one or more processor(s) and associated memory configured to perform a variety of computer-implemented functions (e.g., performing the methods, steps, algorithms, calculations and the like disclosed herein). Thus, the controller system may include a processor therein, as well as associated memory, data, and instructions, each forming at least part of the controller system. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 322 may generally be configured to store information accessible to the processor(s), including the data that can be retrieved, manipulated, created, and/or stored by the processor(s) and the instructions that can be executed by the processor(s). In some embodiments, the data may be stored in one or more databases.

Further, the controller system can communicate with the input/output device, the sensor(s), and the actuators in any suitable way, such as a wired connection or a wireless connection, such as radio signals (RF), light signals, cellular, WiFi, Bluetooth, Internet, via cloud-based devices such as servers, and/or the like. Further, while not shown, the controller system can communicate with a remotely located data center (which can also be a part of control system 106), which the controller system can communicate with by any suitable way, such as a wired connection or a wireless connection, such as radio signals (RF), light signals, cellular, WiFi, Bluetooth, Internet, via cloud-based devices such as servers, and/or the like. Such a data center can include its own controller (and thus processor(s), memory, data, and instructions, substantially similar to that described above with respect to the controller system) which can be configured to perform any of the functions associated with the controller system. The controller system and the data center can be a part of any network facilitating such communication therebetween, such as a local area network, a metropolitan area network, a wide area network, a neural network, whether wired or wireless.

Figure 2:
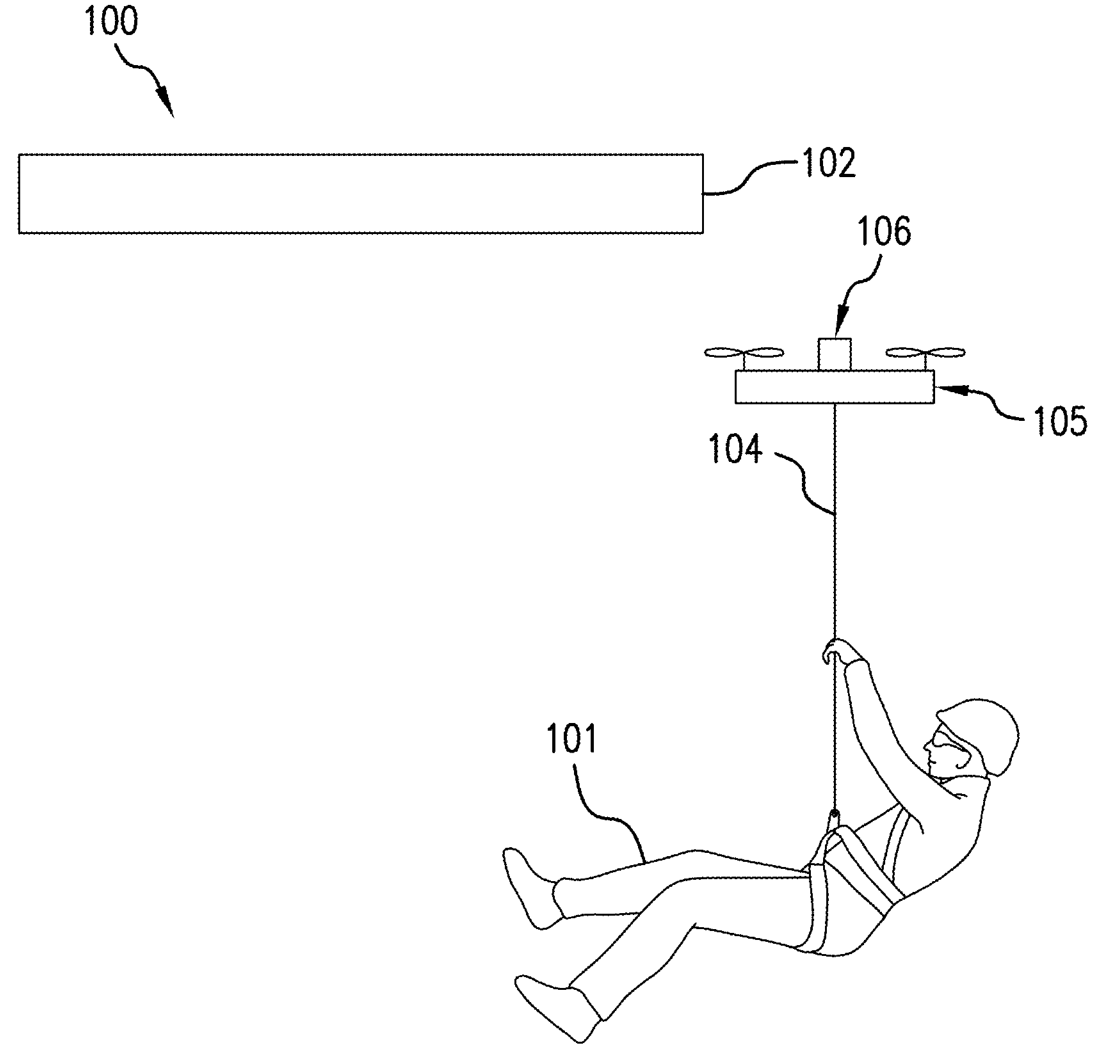
FIG. 2 is schematically a side view of the aerial drone system of FIG. 1, in accordance with an exemplary embodiment of the present invention.
Figure 2:
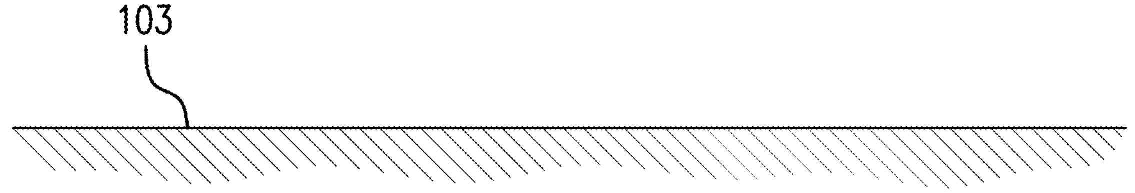

Referring now to FIG. 2, there is shown schematically a side view of drone system 100. However, in FIG. 2, construction worker 101 has fallen off of elevated platform 102 but has not yet reached platform 103. Thus, drone 105, by way of harness assembly 104, supports construction worker 101 in the air (stated another way, construction worker 101 is suspended in the air by drone system 100). Drone system 100 actively and safely arrests the fall of construction worker 101, navigates safely around any obstructions in the flight path of drone 105, and safely lands construction worker 101 on platform 103, thereby saving the life of construction worker or otherwise preventing grievous bodily injury to construction worker 101 due to the fall.

Figure 3:
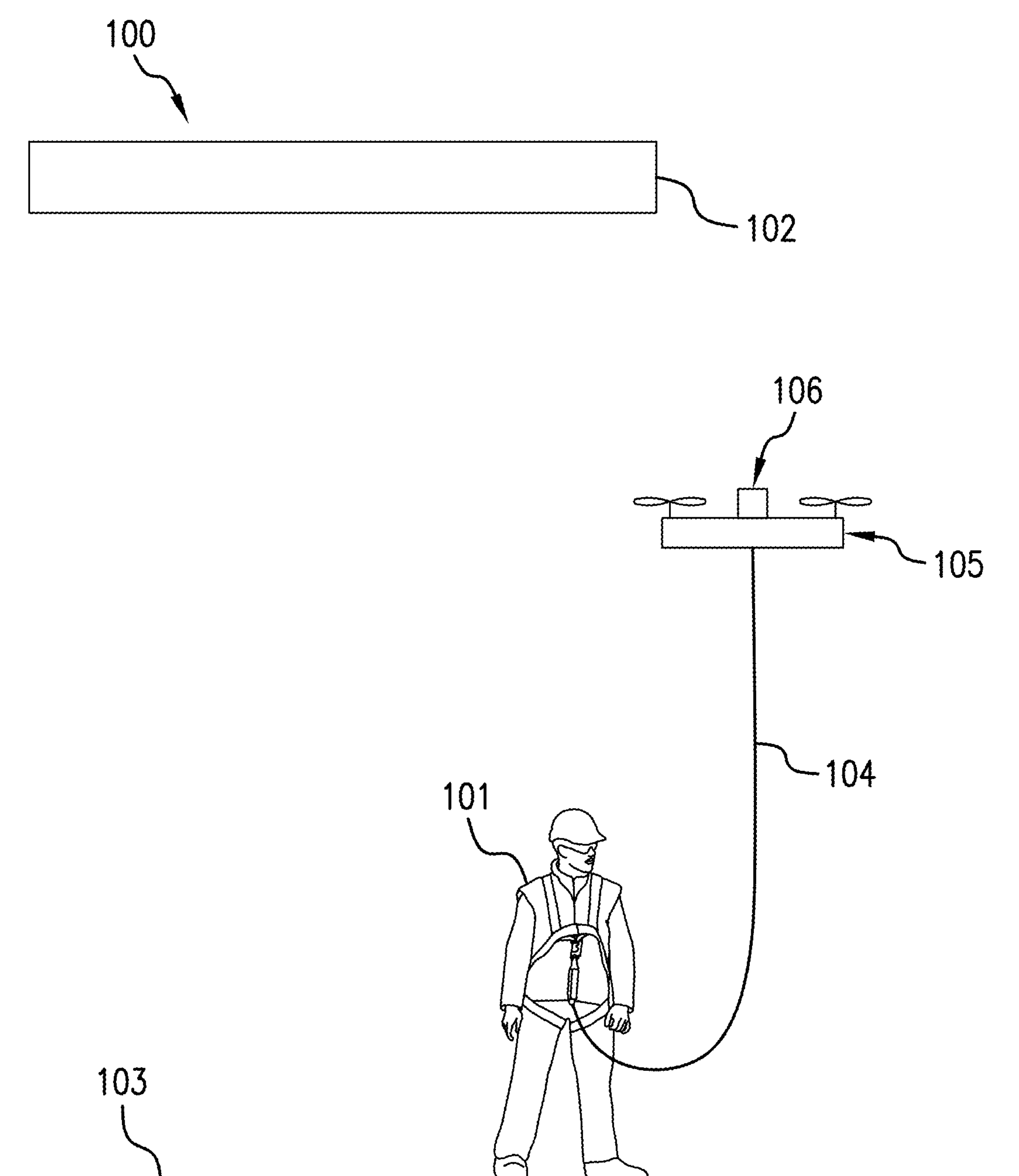
FIG. 3 is schematically a side view of the aerial drone system of FIG. 1, in accordance with an exemplary embodiment of the present invention.

Referring now to FIG. 3, there is shown schematically a side view of drone system 100. FIG. 3 continues the progression from FIG. 2. Thus, in FIG. 3, construction worker has safely landed on platform 103 after the fall.

Figure 4:
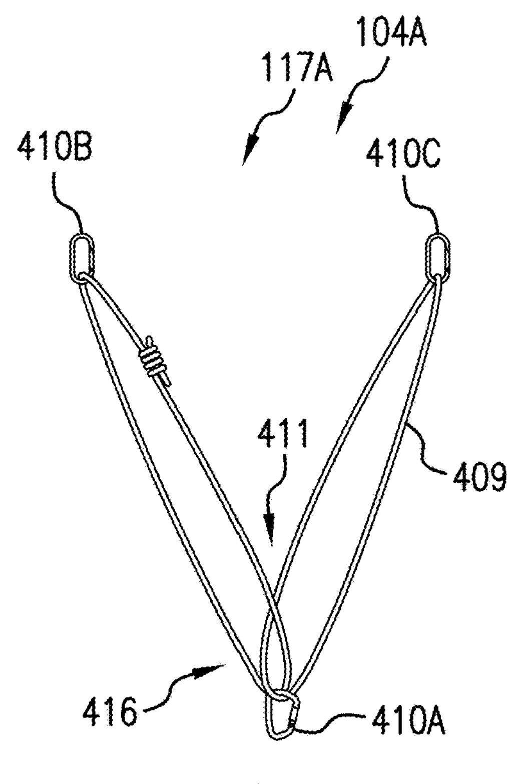
FIG. 4 is schematically a side view of at least a portion of the harness assembly of the aerial drone system of FIG. 1, in accordance with an exemplary embodiment of the present invention.

Referring now to FIG. 4, there is shown schematically a side view of harness assembly 104, more specifically, an exemplary embodiment of at least a portion of harness assembly 104, now referred to as harness assembly 104A (the harness assemblies 104 shown and described herein (i.e., 104A, 104B) are provided merely by way of example and are not intended to be limiting). Harness assembly 104A includes a tether 117A (which is a tether assembly 117A) and body portion 116 (not shown in FIG. 4), wherein tether 117A is an exemplary embodiment of at least a portion of tether 117 schematically shown in FIG. 1. Tether 117A, and thus also harness assembly 104A, includes a single rope 409 (which can be referred to as a linear support) and three carabiners 410A, 410B, 410C, rope 409 being looped through each of carabiners 410A, 410B, 410C. Opposing ends of rope 409 are tied to one another (near carabiner 410B) using any suitable knot. Rope 409 includes a magic X (as is known in the art of climbing) near carabiner 410A at or near what is known in the climbing arts as a master point 416. Carabiner 410A couples in any suitable way to construction worker 101, such as to any suitable equipment coupled to construction worker 101, such as body portion 116. Carabiners 410B and 410C are coupled with frame 107 of drone 105 in any suitable manner, either directly or indirectly, such as by way of arms of drone 105 and/or any other suitable anchor points of drone 105.

Figure 5:
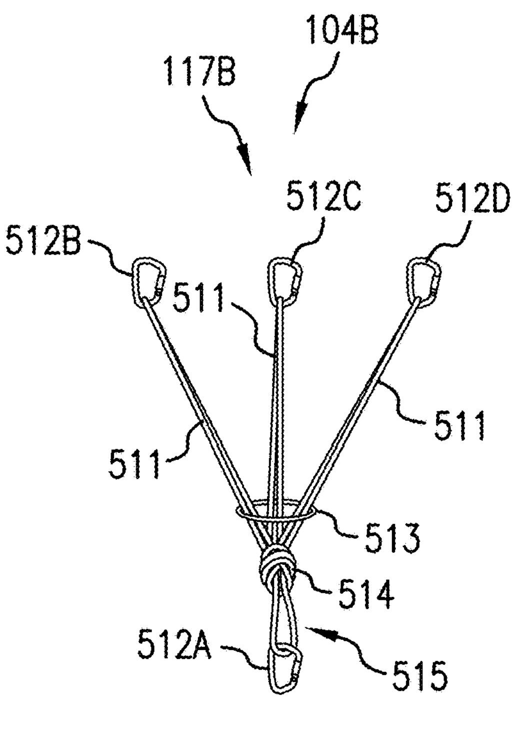
FIG. 5 is schematically a side view of at least a portion of the harness assembly of the aerial drone system of FIG. 1, in accordance with an exemplary embodiment of the present invention.

Referring now to FIG. 5, there is shown schematically a side view of harness assembly 104, more specifically, another exemplary embodiment of at least a portion of harness assembly 104, now referred to as harness assembly 104B shown and described herein. Harness assembly 104A includes a tether 117B (which is a tether assembly 117B) and body portion 116 (not shown in FIG. 5), wherein tether 117B is an exemplary embodiment of at least a portion of tether 117 schematically shown in FIG. 1. Tether 117B, and thus also harness assembly 104B, includes at least one rope 511 (which can be referred to as a linear support) and four carabiners 512A, 512B, 512C, 512D, the at least one rope 511 being looped through each of carabiners 512A, 512B, 512C, 512D. As indicated, tether 117B, and thus also harness assembly 104B, can further include a shelf 513. The at least one rope 511 is tied using a frost knot 514. The at least one rope 511 forms a master point 515 at or near carabiner 512A. Carabiner 512A couples in any suitable way to construction worker 101, such as to any suitable equipment coupled to construction worker 101. Carabiners 512B, 512C, 512D are coupled with frame 107 of drone 105 in any suitable manner, either directly or indirectly, such as by way of arms of drone 105 and/or any other suitable anchor points of drone 105.

In sum, drone system 100 (which can also be referred to as a fall protection system) includes an active tracking function, in order to track construction worker 101. The controller system can detect if construction worker 101 begins to fall, signified by a predetermined triggering event, such as at a predetermined velocity or acceleration. The sensor(s) of control system 106 can detect, for example, a sudden change in vertical downward speed or acceleration of construction worker 101 and use that information to slow construction worker's 101 speed to a predetermined safe speed for landing of construction worker (i.e., 17 miles per hour or less, or some other suitable speed). This deceleration must happen with construction worker 101 facing more than 1,800 pounds of force on his/her body, as understood from the Occupational Safety and Health Administration (OSHA). To secure construction worker 101, construction worker 101 must have a full-body harness, such as body portion 116 that is coupled with tether 117, wherein this full-body harness includes a lanyard which can be coupled with a carabiner, such as carabiner 410A or 512A. The lanyard can be configured so as to be variable in length, based upon the need of the job that construction worker 101 is performing. Connections made between the lanyard and harness assembly 104, as well as between drone 105 and harness assembly 104, can be made by any suitable connectors, such as double-locking connectors, such as carabiners 410A, 410B, 410C, 512A, 512B, 512C, 512D. The anchor point(s) of drone 105 can be (to which carabiners couple 410A, 410B, 410C, 512A, 512B, 512C, 512D therewith) can be located at any suitable location of drone 105 and in any suitable manner. For instance, drone 105 can be configured so as to have one or more suitable anchor points specifically for attaching to harness assembly 104 of any suitable design, or harness assemblies 104A or 104B can be employed so as to attach to any suitable points of drone 105 that can serve as anchor points. Any suitable rope(s) (i.e., ropes 409, 511) and/or strap(s) can be used for harness assembly 104 and any suitable harness assembly (including a lanyard, such as the one referenced above) which construction worker 101 wears; any such ropes and/or straps can be made of any suitable material, such as (by example and not by way of limitation) nylon or any synthetic material or naturally occurring material. The rope(s) (i.e., ropes 409, 511) and/or strap(s) are configured to distribute the weight/force of the falling construction worker 101 to drone 105, such as to the arms of drone 105, so as to prevent such weight or force from being focused on a single point of drone 105. Further, the sensor(s) referenced above would be used not only to detect a fall of construction worker 101 but also to maneuver around objects while construction worker 101 is working (not yet falling) and while construction worker 101 is falling so as to safely deliver the falling construction worker 101 to the ground, such as platform 103. Further, drone 105 can be any suitable size, strength, and power to carry construction worker 101.

Advantageously, the present invention provides drone system 100 that includes an unmanned drone 105 as a fall arrest device, wherein control system 106 enables drone 105 to follow construction worker 101 and to detect when construction worker 101 begins to fall and to prevent that individual from contacting the ground (platform 103) or any objects on the way down to the ground.

In use, drone system 100 includes connections to equally distribute the force and energy created by a fall of construction worker 101 to, for example, the different arms of drone 105. Drone 105 includes the aforementioned sensor(s)—such as the camera—to monitor the activity of construction worker 101 coupled with drone 105. Drone 105 follows construction worker 101 using active tracking technology. Control system 106 also watches construction worker 101 so as to detect when, if ever, construction worker 101 falls. If control system 106 detects a fall by construction worker 101, control system 106 uses drone 105 to slow the descent of construction worker 101, to avoid construction worker 101 from striking other objects during descent, and to land construction worker safely at a location determined to be safe (i.e., platform 103) by control system 106, thereby preventing contact by construction worker 101 with any other hazards in the area.

Figure 6:
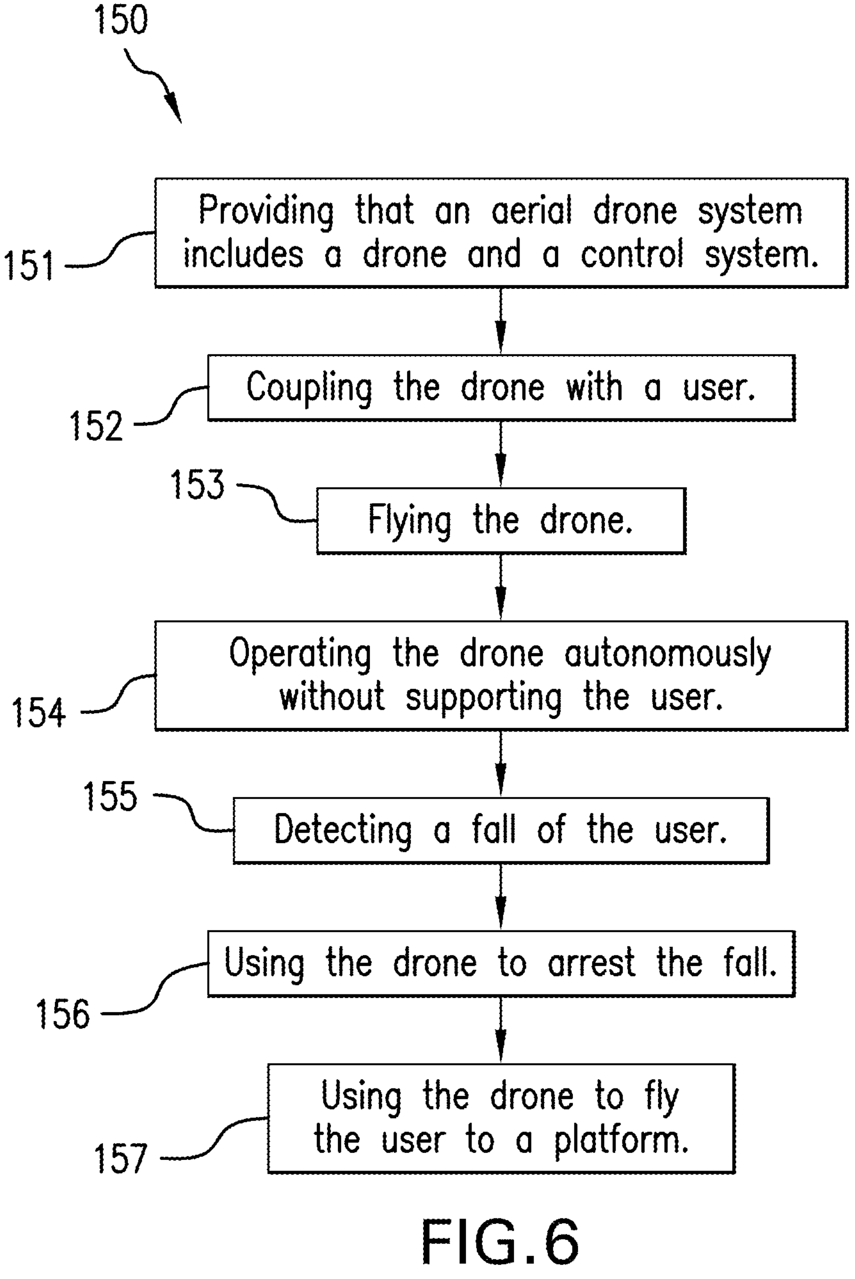
FIG. 6 is a flow diagram showing a method of using an aerial drone system, in accordance with an exemplary embodiment of the present invention.

Referring now to FIG. 6, there is shown a flow diagram of a method 150 of using an aerial drone system. The method 150 includes the steps of: providing 151 that the aerial drone system 100 includes a drone 105 and a control system 106 operatively coupled with the drone 105; coupling 152 the drone 105 with a user 101; flying 153 the drone 105; operating 154 the drone 105 autonomously at a separation distance from the user 101 without supporting the user 101 when the user 101 is not fallen; detecting 155, by way of the control system 106, a fall of the user 101; using 156 the drone 105, by way of the control system 106, to arrest the fall of the user 101 upon detecting the fall and to support the user 101 in the air; and using 157 the drone 105, by way of the control system 106, to fly the user 101 to a platform 103. The drone 105 can include at least one propeller 108. The aerial drone system 101 can further include a harness assembly 104, 104A, 104B coupled with the drone 105 and configured for being coupled with the user 101. The control system 106 can be configured for using the drone 105 and the harness assembly 104, 104A, 104B to arrest the fall of the user 101 upon detecting the fall and to support the user 101 in the air. The harness assembly 104 can include a tether 117, 117A, 117B coupled with the drone 105 and configured for being coupled with the user 101. The tether 117, 117A, 117B can include a linear support 409 and a plurality of carabiners 410A, 410B, 410C, 512A, 512B, 512C, 512D coupled with the linear support. The linear support 409 is a single rope 409. The tether 117, 117B further includes a shelf 513 coupled with the linear support 409.

It is to be understood that the steps of the method are performed by the controller system upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller system described herein, such as the method, is implemented in software code or instructions which are tangibly stored on a tangible computer readable medium. The controller system loads the software code or instructions via a direct interface with the computer readable medium or via a wired and/or wireless network. Upon loading and executing such software code or instructions by the controller system, the controller system may perform any of the functionality of the controller system described herein, including any steps of the method.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An aerial drone system, comprising:

a drone configured for flying, for being coupled with a user, and for operating autonomously at a separation distance from the user without supporting the user when the user is not fallen, the drone including at least one propeller;

a harness assembly coupled with the drone and configured for being coupled with the user, the harness assembly including a tether coupled with the drone and configured for being coupled with the user, the tether including a linear support and a plurality of carabiners coupled with the linear support; and a control system operatively coupled with the drone and configured for:

detecting a fall of the user;

using the drone and the harness assembly to arrest the fall of the user upon detecting the fall and to support the user in the air; and using the drone to fly the user to a platform.

2. The aerial drone system according to claim 1, wherein the linear support is a single rope.

3. The aerial drone system according to claim 2, wherein the tether further includes a shelf coupled with the linear support.

4. A method of using an aerial drone system, the method comprising the steps of:

providing that the aerial drone system includes a drone and a control system operatively coupled with the drone, the drone including at least one propeller, the aerial drone system further including a harness assembly coupled with the drone and configured for being coupled with the user, the harness assembly including a tether coupled with the drone and configured for being coupled with the user, the tether including a linear support and a plurality of carabiners coupled with the linear support;

coupling the drone with a user;

flying the drone;

operating the drone autonomously at a separation distance from the user without supporting the user when the user is not fallen;

detecting, by way of the control system, a fall of the user;

using the drone and the harness assembly, by way of the control system, to arrest the fall of the user upon detecting the fall and to support the user in the air; and using the drone, by way of the control system, to fly the user to a platform.

5. The method according to claim 4, wherein the linear support is a single rope.

6. The method according to claim 5, wherein the tether further includes a shelf coupled with the linear support.

* * * * *